US011875281B2

(12) United States Patent
Ariel et al.

(10) Patent No.: US 11,875,281 B2
(45) Date of Patent: Jan. 16, 2024

(54) SYSTEMS AND METHODS FOR DISTRIBUTING ROUGH DIAMONDS

(71) Applicant: Clara Diamond Solutions Limited Partnership, Vancouver (CA)

(72) Inventors: Aaron Ariel, Vancouver (CA); Dylan Dix, Vancouver (CA)

(73) Assignee: Clara Diamond Solutions Limited Partnership, Vancouver (CA)

( * ) Notice: Subject to any disclaimer, the term of this patent is extended or adjusted under 35 U.S.C. 154(b) by 0 days.

(21) Appl. No.: 15/808,793

(22) Filed: Nov. 9, 2017

(65) Prior Publication Data

US 2018/0137569 A1 May 17, 2018

Related U.S. Application Data

(60) Provisional application No. 62/420,958, filed on Nov. 11, 2016.

(51) Int. Cl.
*G06Q 40/04* (2012.01)
*G06Q 30/08* (2012.01)
(Continued)

(52) U.S. Cl.
CPC ........... *G06Q 40/04* (2013.01); *G06Q 10/087* (2013.01); *G06Q 30/08* (2013.01); *G06T 7/0004* (2013.01); *G06T 17/00* (2013.01)

(58) Field of Classification Search
CPC ....... G06T 7/0004; G06T 17/00; G06Q 40/04; G06Q 10/087; G06Q 30/08;
(Continued)

(56) References Cited

U.S. PATENT DOCUMENTS

| 5,950,178 A | 9/1999 | Borgato |
| 7,487,870 B2 * | 2/2009 | Ceulemans ............ A44C 17/00 |
| | | 206/6.1 |

(Continued)

FOREIGN PATENT DOCUMENTS

| CA | 2325130 A1 | 5/2002 |
| IL | 250326 | 1/2022 |

(Continued)

OTHER PUBLICATIONS

"3D Imaging: 3D reconstruction software maps diamonds", May 2014, https://www.vision-systems.com/cameras-accessories/article/16737370/3d-imaging-3d-reconstruction-software-maps-diamonds, (Year: 2014).*

(Continued)

*Primary Examiner* — Allen C Chein
(74) *Attorney, Agent, or Firm* — Snell & Wilmer L.L.P.

(57) ABSTRACT

Embodiments of the present invention relate to diamond trading system and method for trading diamonds. The system and method may allow rough diamond sellers to list their diamonds for sale individually and enter an ask price for each listed diamond. The system and method may also allow rough diamond buyers to submit their polished diamond parameters and orders. The order may contain a bid price. The system and method may then determine if any of the listed diamonds match to the polished diamond parameters and ordering requirements and if any of the matched diamonds have a bid price at or higher than a ask price. If there is a match and the bid price is at or higher than the ask price, the system and method allow the transaction to proceed.

12 Claims, 2 Drawing Sheets

(51) Int. Cl.
  *G06Q 10/08* (2023.01)
  *G06Q 10/087* (2023.01)
  *G06T 7/00* (2017.01)
  *G06T 17/00* (2006.01)

(58) Field of Classification Search
  CPC ........... G06Q 10/0875; G06Q 30/0611; G06Q 30/0631; G06Q 30/0635; G06Q 30/0643
  USPC .......................................................... 705/28
  See application file for complete search history.

(56) References Cited

U.S. PATENT DOCUMENTS

| | | | |
|---|---|---|---|
| 7,693,751 | B2 | 4/2010 | Aronson |
| 8,527,373 | B1* | 9/2013 | Ricci .................... G06Q 10/087 705/28 |
| 2002/0038282 | A1* | 3/2002 | Montgomery ......... G06Q 40/04 705/37 |
| 2009/0070236 | A1* | 3/2009 | Cohen .................... G06Q 30/00 705/26.1 |
| 2009/0083099 | A1 | 3/2009 | Fetanat |
| 2009/0125435 | A1* | 5/2009 | Cohen .................... G06Q 30/06 705/37 |
| 2010/0250201 | A1* | 9/2010 | Sivovolenko .......... G01N 21/87 703/1 |
| 2012/0101830 | A1 | 4/2012 | Dholakiya |
| 2013/0226765 | A1* | 8/2013 | Tal ......................... G06Q 40/04 705/37 |
| 2014/0279337 | A1 | 9/2014 | Rapaport |
| 2015/0356555 | A1 | 12/2015 | Pennanen |
| 2016/0103938 | A1* | 4/2016 | Ariel ................... G06F 17/5009 703/6 |
| 2018/0137569 | A1* | 5/2018 | Ariel .................... G06Q 10/087 |
| 2018/0260869 | A1* | 9/2018 | Ariel .................. G06Q 30/0619 |

FOREIGN PATENT DOCUMENTS

| | | | |
|---|---|---|---|
| JP | 2001063805 A | | 3/2001 |
| RU | 2012148747 | | 5/2014 |
| WO | 2008045613 | | 4/2008 |
| WO | WO2009068354 A1 | | 6/2009 |
| WO | 2011127870 | | 10/2011 |

OTHER PUBLICATIONS

Therawstone.com, Sep. 2016, https://web.archive.org/web/20160923143123/https://www.therawstone.com/collections/raw (Year: 2016).*

Windemere, "How to Find Out When Something Is Going to Arrive on eBay", 2015, https://web.archive.org/web/20150228222123/https://smallbusiness.chron.com/out-something-going-arrive-ebay-47608.html). (Year: 2015).*

Nash, K.; "IBM Pushes Blockchain into the Supply Chain"; The Wall Street Journal; Jul. 14, 2016; https://www.wsj.com/articles/ibm-pushes-blockchain-into-the-supply-chain-1468528824.

Riaz, Z.; International Search Report from corresponding PCT Application No. PCT/CA2018/050558; search completed Aug. 3, 2018.

European Search Report, Application No. EP17171399 , dated Jul. 3, 2017.

Federal Institute of Industrial Property, Russian Search Report dated Mar. 15, 2021 in Application No. 2017139080.

Search report dated Nov. 30, 2021 in corresponding Russian Application No. 2019141277 filed May 9, 2018; total 4 pages.

Volpicelli, Gian M., "How the blockchain is helping stop the spread of conflict diamonds," Wired, Feb. 15, 2017; https://www.wired.co.uk/article/blockchain-conflict-diamonds-everledger; pp. 1-2.

Intellectual Property India, India Office Action dated Feb. 15, 2022 in Application No. 201927046866 X.

China National Intellectual Property Administration, First Chinese Office Action dated Mar. 29, 2023 in Application No. 201880045211.3.

China National Intellectual Property Administration, Chinese Search Report dated dated Mar. 27, 2023 in Application No. 201880045211.3.

Federal Service on Industrial Property, Israeli Office Action of substantive Examination dated Feb. 6, 2023 in Application No. 2019141277.

USPTO: Notice of Allowance dated Mar. 1, 2023 in U.S. Appl. No. 15/975,692.

* cited by examiner

SYSTEMS AND METHODS FOR DISTRIBUTING ROUGH DIAMONDS

CROSS REFERENCE TO RELATED APPLICATION

This application claims the benefit of U.S. Provisional Application No. 62/420,958, filed on Nov. 11, 2016, the disclosure of which is expressly incorporated herein by reference hereto.

FIELD OF THE INVENTION

The present invention generally relates to systems and methods for trading rough diamonds. More particularly, a system and method that permits sellers of rough diamonds ("Sellers"), via an electronic platform, to sell rough diamonds to purchasers of rough diamonds ("Purchasers"). Sellers refers to miners and rough diamond traders. Purchasers refers to companies which purchase rough diamonds with the intent to manufacture them into polished diamonds.

BACKGROUND OF THE INVENTION

Commodities such as gold, silver, and platinum are considered as homogeneous in nature so they can always have a market price determined at any time depending on the global market. However, such price for an individual rough diamond is difficult to determine because its value is based on its intrinsic factors such as size, model, color, and diamond inclusion type and location. There are infinite combinations based on these factors which cause every rough diamond to be unique. Additionally, Purchasers have unique manufacturing specifications and polished sales distributions. This results in variance among prices for individual rough diamonds. Two Purchasers can give the same rough diamond a totally different price. Thus, in order to determine a universally accepted price and reduce price variance for a resource that is heterogeneous in nature, an assortment process is created in the diamond industry to facilitate diamond transactions.

In the assortment process, Sellers and Purchasers have contractual agreements that require each party to supply and purchase a certain number of rough diamonds, respectively. The transaction occurs at a sales event that is hosted once every five weeks, ten times a year. The agreement requires the Purchaser to buy an allotment of rough diamonds (an "Allocation") at every sales event. An Allocation consists of one or more assortments of rough diamonds (an "Assortment") that a Purchaser can buy at every sales event. An Assortment is a grouping of rough diamonds that are similar in weight, shape or model, color, and clarity. Each Allocation is specific to the Purchaser and every Purchaser's Allocation can be made up of various Assortments. For example, in an Assortment of Crystals 4-8 Grainers that is made up of rough diamonds that range from 0.90-2.49 carats in weight, those diamonds may have a model, color, clarity, and weight with the following specificities:

Octohedron Models (two pyramids back to back)
Color range of D-K
Clarity Range of VVS-SI
Sizes/Weights as follows:
Four Grainers (4GR) (0.90-1.19 carats);
Five to Six Grainers (5-6GR)(1.2-1.79 carats); and
Eight Grainers (8GR) (1.80-2.49 carats).

Overall, each Seller takes its inventory of rough diamonds and sorts the rough diamonds into Assortments. The diamonds in the Assortment are grouped to meet certain parameters such as the one provided above. The parameters for each grouping correspond to the rough diamond requirements by category or subcategory that is common to Purchasers. While each Assortment is generally consistent at each sales event, there is slight variation in composition. Each rough diamond within an Assortment can be assigned a different price per Seller based on its own qualities of weight, shape or model, color, and clarity. An average price is calculated based on the individual rough diamonds within that Assortment. Each Seller has a variation on Assortments that are similar but different.

This approach, however, does not optimize value for either the Seller or the Purchaser. The Sellers utilize the assortment process to sell a broad spectrum of rough diamonds within each Assortment so each Purchaser receives both optimal and suboptimal products for its unique manufacturing purposes. Thus, while each Purchaser buys particular Assortments for their polished diamond needs, there will always be products that the Purchaser cannot use and that must be resold on the secondary market, sold unprofitably as polished diamonds, or held in inventory. The Purchasers have to absorb the loss because the Purchasers need to rely on the diamonds supplied by the Sellers to fulfill their polished diamond demand. The Sellers use this method to sell both less desirable products with desirable products to ensure their whole production is sold. This adverse effect exacerbates as the Purchasers buy more assortments. This approach has not been updated or modified over the last several generations commensurate with the advancement in technology. The Sellers and Purchasers have to meet frequently and be physically present at each sales event to conduct the transaction. In addition, Purchasers are not required to physically inspect each Assortment before agreeing to purchase the rough diamonds. There is an option to physically inspect each Assortment but this requires traveling to a high security facility in Botswana or Belgium to inspect individual diamonds under security cameras or other restrictions. Based on the physical inspection (involving a visual examination by a human), Purchasers may reject an Assortment based on the inspection but the rejection can have significant impact such as with respect to the ability to potentially meet current or future demands. The secondary market of rough diamonds also suffers from the same defects. Accordingly, there remains a need for a system and method that is improved over the current diamond transaction process.

BRIEF DESCRIPTION OF THE DRAWINGS

The nature and various advantages of the present invention will become more apparent upon consideration of the following detailed description, taken in conjunction with the accompanying drawings, in which like reference characters refer to like parts throughout, and in which.

DETAILED DESCRIPTION OF THE INVENTION

Figure 1:
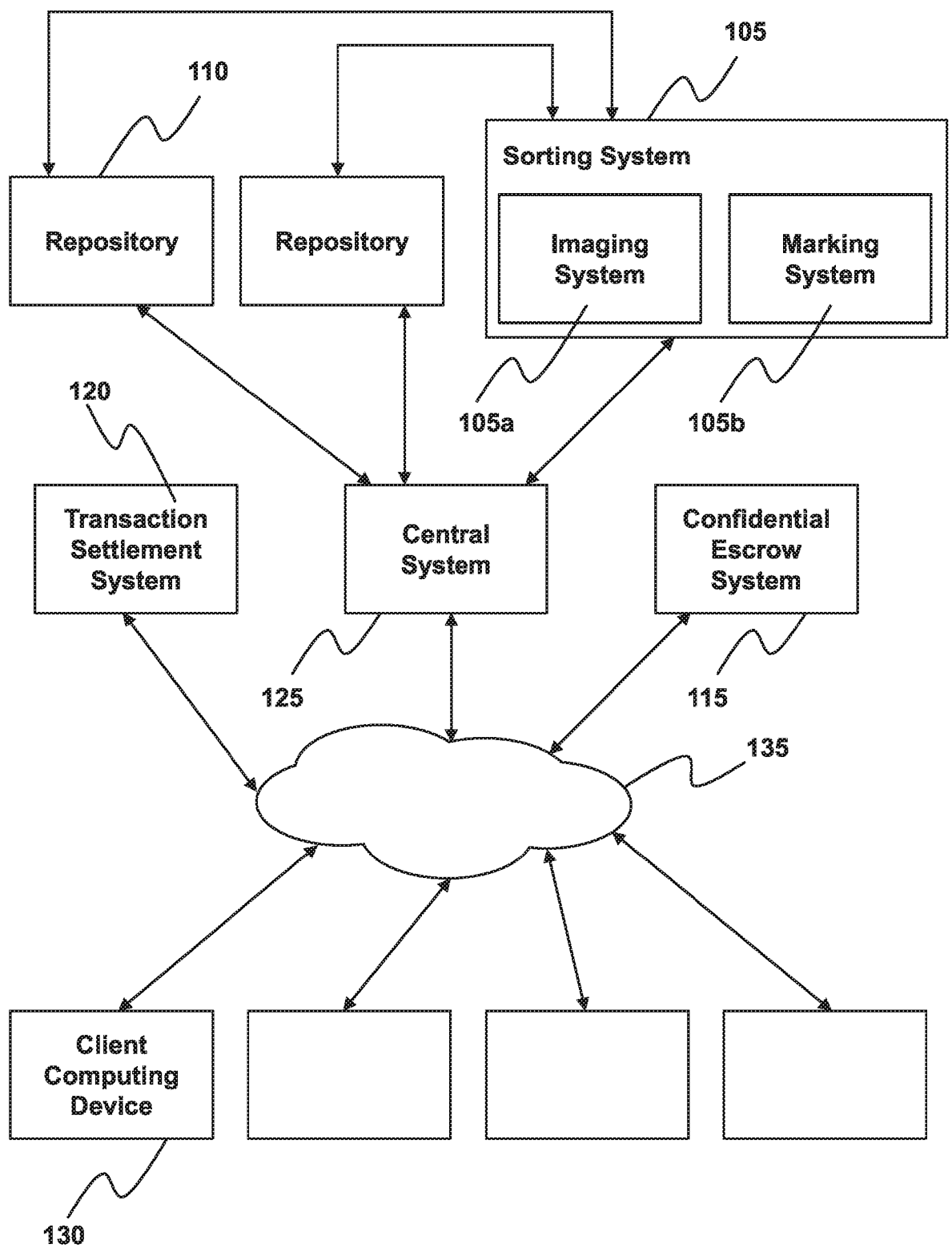
FIG. 1 is a block diagram illustrating an overview of an environment in which some embodiments of the present invention may operate.

A computer implemented interactive platform (computer implemented electronic system(s) that can include specialized software applications, related data, and physical control over rough diamond distribution) can be provided. The platform permits the offer, sale, and distribution of rough diamonds by Sellers to Purchasers and as a result, into the overall diamond marketplace. Each rough diamond is scanned in order to create a 3D virtual model. A sorting system is implemented, using one or more computers and databases, that creates identifiers for each rough diamond and associates the virtual model with the identifier. The sorting system is configured to store each rough diamond with a physical identifier which can involve transferring each rough diamond to a physical container that has such an identifier. Each rough diamond is physically sorted and handled to have an identifier by way of a container for each individual rough diamond. The rough diamonds are stored in secure repositories in various geographic locations and the location information is also stored in the database for each rough diamond.

Each Purchaser owns highly confidential and proprietary information that specifies the critical details of its manufacturing process for each type of cut of polished diamond. For example, two Purchasers can be manufacturers of similar shapes of polished diamonds but each Purchaser will produce a different polished diamond because of its proprietary manufacturing specifications. This information is also closely tied to each Purchaser's polished diamond distribution. The platform will include a secure data system (computer with security enhancements) that stores the proprietary manufacturing information of each Purchaser and maintains the confidentiality of that information throughout the operation of the platform. For example, a third party trusted vendor such as one offered by Sarine, can be used to store this information. The third party trusted vendor is an example of one approach, but others are contemplated. A software application is implemented on the platform that applies the data in each file containing the proprietary manufacturing process for each polished diamond cut to the 3D virtual model of each individual rough diamond. The software application processes spatial and physical properties (e.g., interior imperfections) and as a result produces an output that communicates that the rough diamond corresponds to a potential polished diamond that matches that manufacturing process. The platform can provide an interface through which a Purchaser can specify a rough diamond order (individual diamonds, potentially as a batch). The order can specify a particular manufacturing process that is owned by Purchaser and is stored in the confidential system. The order can be an electronic message which can be inputted through a browser or application interface. The order can specify ranges of parameters and an offer price for each individual rough diamond. Each Seller can specify an ask price for rough diamonds that meets certain rough diamond characteristics, groupings of parameters. The platform can process each individual rough diamond and when a match exists and the bid price is at or above the ask price, the platform executes a process for completing the sale of that rough diamond to the bidding Purchaser. In response to the transaction, information is updated in the database to represent that the rough diamond has been sold and related information can be updated. The platform can include a distribution process in which each of the rough diamonds are physically retrieved and moved through a distribution chain, which can include aggregating rough diamonds sold to the same Purchaser and checking identifiers at points through the chain to confirm the secure transfer of each rough diamond to the facility of the Purchaser.

In operation, the platform operates in an automated manner by having the process applied to individual rough diamonds without providing the Sellers or Purchasers to inspect or confirm individual rough diamonds for purchase. Preferably, the platform maintains pending orders, the volume of pending orders, prices, and volume of transactions ("sales") confidential such that the information is not available or displayed to Sellers and Purchasers and is maintained confidential through its operation except for communicating the volume sold or purchased for a corresponding user and the price paid or received.

The secure data system (e.g., an escrow system) can be implemented external to the computer systems of the Purchasers and Sellers, by the computers of the platform that are responsible for executing the transactions. The Purchaser's computer devices can connect to the secure data systems over a network using a secured protocol. The computers that are adapted to handle transactions can also implement secure connections with the secure data systems. The arrangement provides for the ability to carry out such processes while maintaining a higher level of confidence. Other techniques for providing confidence or trust are also contemplated.

Various embodiments are contemplated. For example, FIG. 1 is a block diagram illustrating an overview of an environment 100 in which some embodiments of the present invention may operate. The environment 100 may include a rough diamond sorting system 105, one or more rough diamond repositories 110, a confidential escrow system 115, a transaction settlement system 120, a central system 125, and one or more client computing devices 130, which can each be implemented by a computer or a specialized computer or device, one or more software application and data values. The rough diamond storing system 105, repositories 110, or other components can include mechanical or electromechanical equipment for storing, moving, handling, sorting, or inspecting individual rough diamonds. The central system 125 and the client computing devices 130 may be connected through a network 135. A diamond trading system is contemplated based on some or all of these systems and devices.

The rough diamond sorting system 105 may comprise of an imaging system 105a and a marking system 105b. The imaging system 105a may perform a 3-dimensional (3D) scan of the interior and a 3D scan of the exterior of each rough diamond and generate an imaging file containing a 3D virtual model and associated information for the rough diamond. The 3D virtual model may be a 3D physical representation of the rough diamond created by combining the two scans. The 3D virtual model may also display the locations of inclusions. The associated information may include shape, cutting style, physical dimensions, weight, diameter, crown information, girdle information, pavilion information, table information, clarity grade, color grade, the type and location of inclusions, other physical information, or any combination thereof of the rough diamond. The imaging files may be saved in a database of the imaging system 105a that is accessible by the central system 125. For example, the imaging system 105 may be a Galaxy machine, on the market by Sarine, and the imaging file may be a Galaxy file. The marking system 105b may establish an identifier for each rough diamond. The identifier may be established by placing each rough diamond in a container having an identification number, tag, label, or other identifier. The sorting system 105 may associate each imaging file with the corresponding identifier or rough diamond. The imaging files are accessible by the central system 125 and the sorted diamonds (diamonds that are imaged and marked)

may be stored in one of the repositories 110. The identifier may also indicate which repository the rough diamond is stored.

The repositories 110 may be distributed around the world in different geographic locations. Each of the repositories 110 may be located in the same area where the rough diamond trading centers are located, specifically, Antwerp, Tel Aviv, Surat, Mumbai, Dubai, Singapore, South Africa, Namibia and Botswana. The location of the sorting system 105 may also be the same or different with respect to the location of the repository and the location of the mining operation. Each repository may be equipped with a computer system to keep track of its inventory (or the Seller's inventory). The computer system may be accessible to the central system 125 so the central system 125 knows which rough diamonds are stored at the repository. The sorting system 105 and the repositories 110 may be utilized by Sellers to process and store their rough diamonds and to provide the imaging files to the central system 125. Each imaging file may be accompanied by a sale price (or a ask price) for the rough diamond. The price may be determined by the Seller after reviewing the imaging file or by the sorting system 105 pursuant to factors set forth by the Seller.

The confidential escrow system 115 is a system that stores Purchasers' polished diamond parameters. Each Purchaser has its own unique manufacturing processes that are suitable to polish certain types of rough diamonds and that can produce polished diamonds unique to their manufacturing specifications and polished diamond distribution. Polished sales distribution refers to the Purchaser's unique network of customers who have their own set if unique parameters and specifications when purchasing and costing polished diamonds. A polished diamond parameter is a facet arrangement and corresponding range of angles and ratios which define a particular diamond shape or cut unique to a Purchaser. The information may include variable angles, depths, shapes, length to width ratios, and other information. Each Purchaser can have multiple sets of polished diamond parameters for each diamond shape. If desired, the polished diamond parameter may also include a Purchaser's customer's unique parameters and specifications when purchasing and costing polished diamonds. Because the information may reveal the Purchaser's special manufacturing processes and unique network of customers, the polished diamond parameters are confidential and proprietary information. Thus, the information is provided by the Purchaser to the confidential escrow system 115 and is only accessible by its owner and the central system 125. While other Purchasers may access the central system 125 through their client computing devices 130, the polished diamond parameters stored on the confidential escrow system 115 for each Purchaser are not available to one another and are maintained confidential throughout the operation of the system.

The central system 125 is connected to the sorting system 105 and the confidential escrow system 115 and can access imaging files and polished diamond parameters in the respective system. The central system 125 may access all the imaging files available on the sorting system 105 and perform an analysis on each imaging file with a Purchaser's polished diamond parameters. The analysis may apply the associated information in the imaging file to the polished diamond parameters using a software application that can identify potential rough diamonds that match those parameters in that rough diamond and as a result, identify the potential polished diamonds that can be produced from the rough diamond based on those parameters.

If desired, the automated computer process can determine suitability of the rough diamond to the Purchaser based on the evaluation. The evaluation may include evaluating the number, size, locations, and quality of the potential polished diamonds and generating the potential polished diamonds within the virtual model. Suitability may be based on how much information in the imaging file match to the parameters, how the potential polished diamonds fit into the Purchaser's sales distributions, and the price that the Purchaser is willing to pay for those rough diamonds. (Each of which may be specified in a Purchaser's order described below). The central system 125 or other system element is preferably configured to perform an analysis that identifies the most valuable polished diamond that can be produced from a particular rough diamond in accordance with a particular Purchaser's manufacturing process such as by using the polished diamond parameters.

The central system 125 may output messages or information (information as used herein refers to electronic data values) only identifying rough diamonds that are suitable to the Purchaser. The central system 125 may output the messages or information identifying suitable diamonds by creating an evaluation file for each. If desired, the evaluation tile when executed by the central system 125 may display information such as the virtual model and the potential polished diamonds within the virtual model, the size, number, and locations of the potential polished diamonds, some or all of the associated information, some or all of the parameters, a comparison between the associated information and the parameters, additional information generated by the comparison or the evaluation step, or any combination thereof. There may be different levels of suitability such as Excellent, Good, and Satisfactory and this information may be included in the evaluation file as well.

The central system 125 may perform the aforementioned functionalities in response to an order placed by the Purchaser through its client computing device. Although the order will be purchasing rough diamonds located in the repository, the order relies upon polished diamond parameters, which specify characteristics that are specific to polished diamonds and in particular values or information (e.g., the digital file or association with the digital file specifying that manufacturers desired polished diamond cut) that are a baseline for the polished diamond that the Purchaser has the objective to manufacture, rather than rough diamond criteria ("polished diamond order" is used as a term to refer to this). The polished diamond order can include the polished diamond parameters, which can include polished diamond criteria such as size, weight, color, and clarity, the number of diamonds in the polished diamond order, a bid price list including a bid price for each criteria, and a discount or adjustment for fluorescence. Other criteria or order can be included or are contemplated and would be evident as applicable from the disclosure but the polished diamond order as explained includes a baseline or grouping of parameters that are specific only to ordering polished diamonds that allow for the bidder to define in virtual terms a polished diamond that the Purchaser seeks to purchase. For example, a polished diamond order by a Purchaser may indicate that the Purchaser needs 100 of 1.00 carat oval polished diamonds (with associated proprietary manufacturing information) that have a color greater than or equal to J and a quality greater than or equal to SI. Rough diamonds in the sorting system will be searched and analyzed to evaluate if they could be manufactured to satisfy the polished diamond order.

The polished diamond order may or may not include requirements or specifics or permit the user to enter a requirement or specific that is particular to rough diamonds and would be understood to correlate to specifying characteristics of a rough diamond. The central system 125 may provide an interface allowing the Purchaser to enter its orders through its client computing device. The central system 125 is preferably configured to provide connections or interfaces that provide Purchasers to enter and transmit polished diamond orders into the rough diamond distribution system (such as the one shown in FIG. 1 or one based on some of the systems shown in FIG. 1). This has many advantages such as permitting a wide range of participants to use the central system 125. The central system 125 performs an underlying conversation of the polished diamond order to be compatible with rough diamond bids.

When an order is received by the central system 125, the central system 125 accesses all the imaging files and polished diamond parameters from the respective system and performs an analysis on each imaging file with that Purchaser's polished diamond parameters. From the analysis, the central system 125 determines all the rough diamonds that are suitable for the Purchaser's polished diamond order and may provide the Purchaser with the rough diamonds which satisfy the Purchaser's polished diamond order based on the Purchaser's own profit determination, or based on intelligence within the system to evaluate the profitability using the Purchasers financial information. The profit for the Purchaser would be the value differential between the resulting polished diamond and the cost of the rough diamond. The order can further govern the determination step by determining only rough diamonds that meet the order requirements from all the potential rough diamonds and the outputting step by creating an evaluation file for each of the rough diamonds that meet the order requirements. In some embodiments, the central system 125 may perform the aforementioned functionalities periodically. In this situation, all the suitable rough diamonds are determined before the order and the order instructs the central system 125 to determine and output rough diamonds that meet the order requirements from those diamonds. In some embodiments, the central system 125 may perform the aforementioned functionalities as, if desired, the Purchaser is permitted to browse through the inventory of imaging files. In this situation, the imaging files may already be available on the central system 125 or be accessed and be available in real-time to the central system 125. When the Purchaser browses a rough diamond, the central system 125 may immediately perform the analysis and the output step for the diamond.

As partly discussed above, the central system 125 may be configured to include intelligence using software programming that controls the operation of the central system 125. As such, the central system 125 may be configured to implement certain advances in the execution of individual transactions for the sale and distribution of rough diamonds. In one approach, the central system 125 is configured to implement operations in which a period of searching or data collection is conducted over period of time that is used to find and identify whether the virtual model of a particular rough diamond satisfies two or more polished diamond orders, compares the bid prices in the polished diamond orders, and selects the polished diamond order that provides the highest bid price (among the matching polished diamond orders). This would be an automated process (without requiring human or manual intervention). It would provide improved financial performance from the perspective of the platform.

Another intelligent component that can be implemented relates to improving operation of the rough diamond market for the Purchasers. The central system 125 is configured to implement operations or computer implemented processes in which a period of searching or data collection is conducted over a period of time that is used to find and identify whether two or more virtual models of corresponding rough diamonds satisfy an individual polished diamond order, compares the ask prices for the corresponding rough diamonds, and selects the rough diamond that provides the lowest ask price (among the matching rough diamonds or polished diamond orders from different Purchasers). This would be an automated process (without requiring human or manual intervention). It would provide improved financial performance from the perspective of the Purchasers.

There can also be automated intelligence related to the orders. In some embodiments, the central system 125 can be configured to analyze orders and make a determination with respect to the process that should be implemented to fill the order within the system. Central system 125 can be configured to handle small orders differently than large or recurring orders. A small ask order (e.g., small polished diamond order) can be one that is relatively small compared to the volume of rough diamonds that are available in a period of time or for example, it can be 10% or less of the volume of available rough diamonds through the central system 125 in a month. In a related aspect that can also be implemented to incorporate intelligence into the overall system, the central system 125 can control which events or at what locations the processing that selects or intelligently matches bids and ask is performed. The central system 125 can trigger an evaluation when each individual rough diamond enters the overall system. The loading of individual virtual models at repository can trigger this evaluation and consequently the matches. The operation can be performed in different locations and in parallel which can expedite the completion of large recurring orders. The operation can be performed when a new bid order (or new bid orders) is received by the central system 125. If for example, it is an order for a small number of diamonds, the central system 125 can trigger a search (at or from the central system 125) to find the necessary rough diamonds from all currently available rough diamonds in the system (e.g., all repositories). These features would be an automated processes (without requiring human or manual intervention).

In some embodiments, the central system 125 can be configured to receive a polished diamond order, evaluate the rough diamond collection and the polished diamond parameters in the order to identify (and as a result identify) rough diamonds that match the polished diamond parameters, rank the identified rough diamonds based on the difference between the bid price and the sell price, allocate the identified rough diamonds to the matched order based on the rank, and provide imaging tiles of the allocated diamonds to the purchaser submitted the order. The identified rough diamonds also have a bid price at or above the ask price. In operation, the identified rough diamonds may be ranked from highest difference to lowest difference. The system may implement an operation to address "over-matching," when the system identifies a number of matching rough diamonds that are greater than is required in that order. It can do so by allocating based on the rank that is determined using the order price difference. More specifically, when the polished order specifies a total number of rough diamonds (or a number of rough diamonds for one of multiple criteria in the order) that is less than the total number of identified rough diamonds, the total number specified in the order (or the number of rough diamonds for that one criteria) may be the number of identified rough diamonds to be allocated to the order (or the criteria), and the allocation may start from the identified rough diamond with highest difference toward the identified rough diamond with lowest difference until the order (or the criteria) is fulfilled. Therefore, rough diamonds with highest difference may always be allocated to the order (or the criteria). When the polished diamond order specifies a total number of rough diamonds (or a number of rough diamonds for one of multiple criteria in the order) that is more than the total number of identified rough diamonds, all the identified rough diamonds may be allocated to the order (or the criteria).

The central system 125 may also keep track of the number of outstanding diamonds in the order (or the criteria) and may repeat the above steps (namely, the evaluation step, the rank step, the allocation step, and the imaging file providing step) until the order (or the criteria) is completely fulfilled.

The aforementioned processes describe intelligent processes that are implemented such as when one Purchaser places a polished diamond order, the central system 125 searches and locates the most suitable and competitively priced rough diamonds to satisfy the Purchaser's polished diamond order. The central system 125 is also configured to permit multiple Purchasers to place competing polished diamond orders. When these orders are submitted, the central system 125 will search and locate the most suitable and competitively priced rough diamonds. When there are rough diamonds suitable for and can be allocated toward more than one of these orders, the central system 125 will allocate those rough diamonds to the order with the highest bid price.

Another embodiment of the process may occur when the central system 125 aggregates all of the competing polished diamond orders. The aggregated orders may be referred to as the order collection and be stored in a database. The central system 125 searches and analyses each rough diamond in the sorting system and allocates each suitable rough diamond to the Purchaser with the highest ask price in their respective polished diamond order.

There can also be automatic intelligence related to new rough diamond entering the central system 125. In some embodiments, the central system 125 can be configured to detect if a new rough diamond has been processed by the sorting system, access the order collection and determine if the new rough diamond matches to one or more orders in the order collection based on the polished diamond parameters in the order when the system detects that the new rough diamond has been processed by the sorting system, rank the matched one or more orders based on the difference between the bid price and the ask price, allocate the new rough diamond to the order with largest difference, and provide the imaging file of the new rough diamond to the purchaser of the order with largest difference. The one or more orders may be ranked from highest difference to lowest difference. When there are two or more orders with the same amount of difference, the new rough diamond may be allocated to the order with a smaller number of outstanding rough diamonds so that order can be fulfilled first and the number of outstanding orders on the system can be reduced quicker. The central system 125 may also keep track of the number of outstanding diamonds in each order and fulfills each order by performing the above steps until the order is fulfilled. The central system 125 can ensure that the new rough diamond is sold to the Purchaser who is willing to pay the highest price for the diamond based on that Purchaser's polished diamond parameters.

The central system 125 is accessible by Sellers and Purchasers. The central system 125 may allow Sellers to have their rough diamond inventory (in the form of imaging files) be presented to Purchasers. Sellers may have their sorting systems connected to the central system 125 and have the imaging files become available to the central system 125 after the rough diamonds are scanned. The central system 125 may also provide an interface for Sellers to enter information from the image file and sale price or upload the imaging file. Since an imaging file is associated with only one rough diamond, a Seller can list the rough diamonds in its inventory individually, rather in assortments or groups, through the central system 125. The sale price for each rough diamond may be stored in a sale price database. The sale price or the database may not be available to Purchasers. The central system 125 may also allow Purchasers to submit orders and to browse each Seller's inventory and submit a purchasing price for the rough diamond it would like to buy. The orders or the purchasing prices, whether it is the purchasing price in an order or the purchasing price submitted while browsing, may be stored in a purchasing price database. The purchasing price or the database may not be available to Sellers.

The rough diamond inventory of each Seller may be stored in a database. This collection of inventories may be all the available rough diamonds on the central system 125 or be referred to as the rough diamond collection. As described above, each rough diamond in the rough diamond collection is scanned by the imaging system and is provided with an imaging file that contains a 3D virtual model and associated information for the rough diamond. Each Seller may also provide additional information that includes color, fluorescence, and minimum Seller price of the rough diamond for each rough diamond in its inventory. The additional information may be stored in the same database in which the rough diamond collection is stored. The database is accessible by the central system 125. The collection may be updated automatically whenever a new rough diamond is processed by the sorting system.

The evaluation and matching of orders can be performed at the central system 125 in a distributed fashion or similarly in cooperation with a rough diamond sorting system 105 or one or more rough diamond repositories 110. The entry of individual new diamonds into the sorting system or repository can trigger the process to identify the matching orders and allocation. The process can be performed in parallel (e.g., simultaneously) at different locations and the central system 125 will then resolve conflicts (e.g., overmatching) when it receives related information. The matching and allocation to orders can also be triggered when a new order is received which may involve transmitting order information to such distributed locations.

From the sale price (or the ask price) and purchasing price (or the bid price), the central system 125 can determine whether the bid price is at or above the ask price. The rough diamond for which the prices are being compared is a rough diamond that meets all the Purchaser's order requirements except the price. If the bid price is at or above the ask price, the sale can proceed by having the central system 125 communicate with the financial settlement system 120 which received financial information for each party and tracks and settles transaction as they proceed. The central system 125 may output those diamonds with the bid price at or above the ask price with an evaluation file for each, and the Purchaser can review the evaluation files and select one or more of the evaluation files to let the sale go through. The central system 125 then transmits and stores a message indicating the sale of the rough diamond associated with the evaluation file. The message may be transmitted to the computer system at the repository where the sold diamond is stored and the Purchaser's client computing device. In response, the sold diamond is removed from the repository and shipped to the Purchaser. The sold diamond is also removed from the database storing information about that diamond. The aforementioned process may be provided by a trusted third party.

The transaction settlement system 120 may be a payment system that links financial accounts of Sellers and financial accounts of Purchasers and provides for monetary exchange using bank withdrawals and bank deposits. The payment system may also be based on credit mechanisms such as withdrawing funds from and depositing funds into credit card account and debit card account. The financial information (e.g., bank and credit card information) may be pre-entered into the transaction settlement system 120 or provided to the transaction settlement system when central system 125 determines that the sale should go through. With the available financial information from each party and the Purchaser indicating its desire to proceed with the purchase, the transaction settlement system 120 examines the financial information received from the Purchaser and check if the Purchaser can make the payment of the sold diamond. The transaction settlement system 120 also examines the financial information received from the Seller and check if the Seller can receive the payment of the sold diamond. If both checks pass, the fund is withdrawn from and deposited into the corresponding account. If one of the checks fails, the transaction is denied. In this situation, the Purchaser may be asked to provide an alternative payment method or the Seller may be asked to provide an alternative receipt method. The examination and check steps may then be repeated until the transaction goes through. Each party is then notified and the Seller removes the sold diamond from the repository and ships it to the Purchaser. In some embodiments, with respect to each transaction for a rough diamond, if the bid price is higher than the ask price, the process directs the amount above the ask price to a financial account that is associated with the operation of the platform.

The client computing devices 130 may be desktop computers, laptop computers, iPads, tablets, personal digital assistant devices (PDAs), mobile phones, or other similar devices allowing the Purchaser to communicate with the central system 125, the confidential escrow system 115, and the transaction settlement system 120. Via this device, the Purchaser can submit orders to the central system 125, provide polished diamond parameters to the confidential escrow system 115, and supply financial information to the transaction settlement system 120.

The network 135 can be a local area network (LAN) or a wide area network (WAN), but can also be other wired or wireless networks. The network 135 may be the Internet or some other public or private network. The client computing devices 130 can be connected to the network 135 through a network interface, such as by wired or wireless communication. The repositories 105 and other systems 110, 115, 120 can be similarly connected to the central system 125, to the client computer devices 130, and to each other. The bidirectional arrow indicates that data can be transmitted and received between the systems and devices or that rough diamonds can be moved between locations. For example, the client computer device 130 can communicate with the central system 125 to submit polish diamond orders and the central system 125 can communicate information identifying the most suitable and competitively priced rough diamond based on the orders to the client computer device 130. For another example, the central system 125 can communicate to a repository 110 that a rough diamond has been sold and the repository 110 can communicate to the central system 125 that the sold diamond has been removed from the repository 110 and is in transit to the Purchaser. It should be generally understood that communications between computers or computer system can be performed by way of electronic messages that carry information or data values using communications protocols. Communications within a computer or computer system are also carried out depending on the situation using binary signals or electronic messaging to carry out the features illustratively described herein.

The arrangement can configured the central system 125, transaction settlement system 120, sorting system 105 and repository 110 (in each case there can be multiple facilities for each that are distributed throughout the world) configured to operate on a private network. A demilitarized zone ("DMZ") can be implemented that can include firewalls and web servers as a "front end" for private network. This can permit external devices (such as computers of Purchasers or Sellers) to communicate with the central system 125, for example, only through the DMZ. If desired, confidential escrow system 115 can be in the private network and would require access through the DMZ server or that system can be implemented as a standalone system such as by an existing service provided by Sarine.

In some embodiments, when a match is executed and settled, one or more messages are transmitted to the Seller and the related repository. In response, the Purchaser can collect the individual diamond and other items that have been sold and delivered to a local office of the platform or to a third party. At the point of delivery, the diamonds that have been delivered or reviewed for their identifier and potentially scanned in order to verify the correct diamonds have been delivered. The receiving location can sort and aggregate received rough diamonds for transportation to the next distribution point.

Although FIG. 1 illustrates that the systems and devices are separated, some of these systems and devices may be built into one system or device. For example, the central system 125 may be configured to include the confidential escrow system 115 and the transaction settlement system 120 and the computing client device 130 can communicate with the central system 125 directly without resorting to other systems. For another example, the central system 125 may be implemented on the client computing device 130 and the connections bidirectional arrows) that were associated with the central system 125 may now be associated with the client computing device 130. In this situation, the central system 125 may be implemented as a software module including the intelligent processes executable by the client computing device 130. When embodiments of the present invention are implemented by separate systems and devices as shown in FIG. 1, the connection or directional arrow between each system and device is controlled by a different network operation or under a different network domain to communicate that they are separate system or device.

The computing devices for the Sellers can be implemented in a way similar to Purchasers' or can be implemented at repositories or at the sorting system. Sellers may have their own computing devices separate from the other systems for the purpose of allowing them to specify prices for rough diamonds and to manage its interaction with the overall system.

Figure 2:
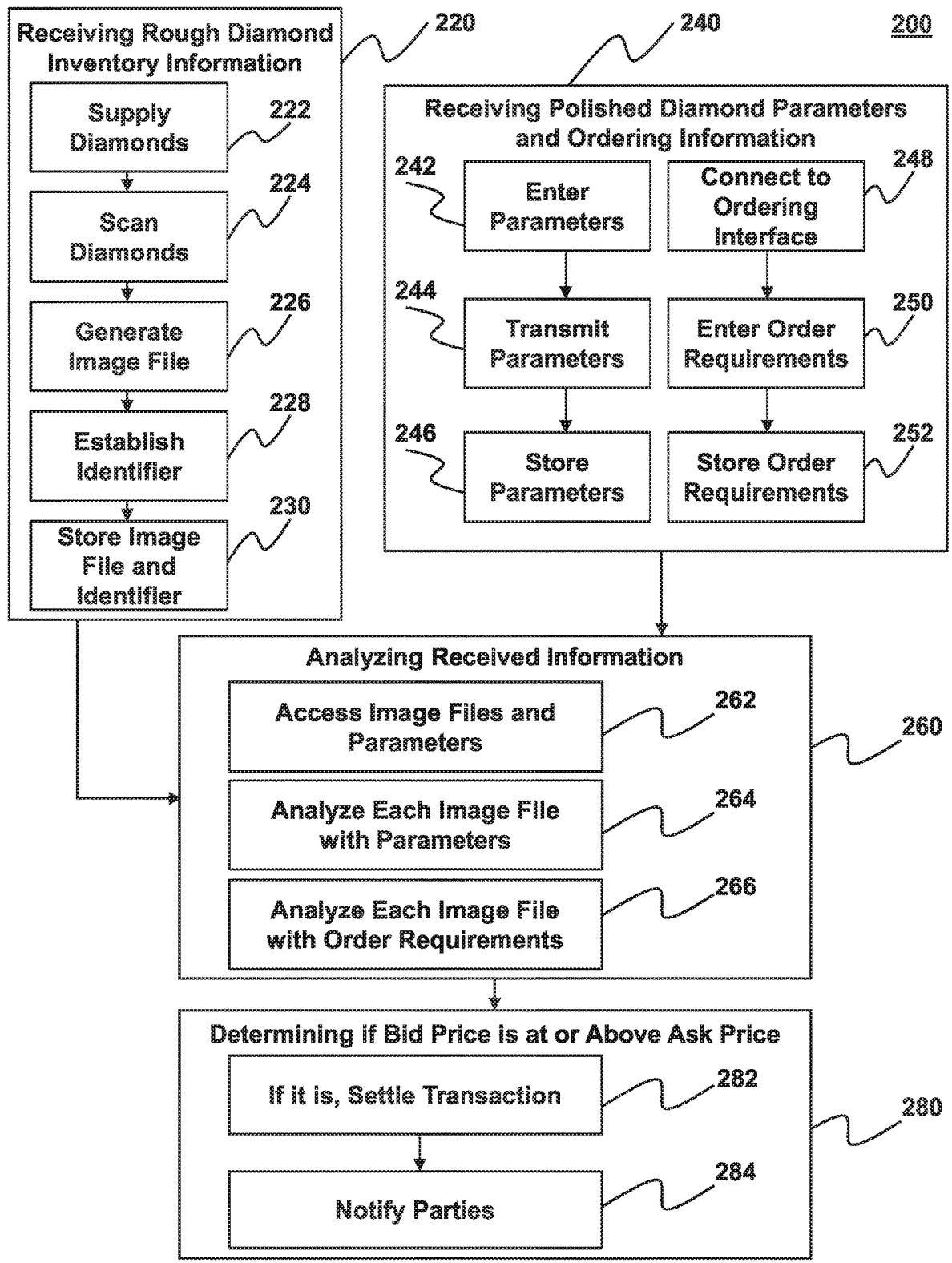
FIG. 2 is a flow diagram illustrating a method for trading rough diamonds in accordance with some embodiments of the present invention.

FIG. 2 depicts a flow diagram illustrating a method 200 for trading rough diamonds in accordance with some embodiments of the present invention. The method 200 may comprise receiving rough diamond inventory information 220, receiving polished diamond parameters and ordering information 240, analyzing the received inventory information and the received parameters and ordering information 260, and determining whether diamond transaction should proceed based on the analysis 280.

In step 220, the rough diamonds may be provided by Sellers and Sellers may obtain rough diamonds from mining operations or other Sellers. These diamonds may be the inventory of a Seller, and the inventory information may be received by the central system by supplying the obtained rough diamonds to a sorting system 222 and operating the sorting system to scan each rough diamond 224, generate an imaging file for each rough diamond 226, establish an identifier for each rough diamond 228, and store the imaging file and the identifier for each rough diamond in a database 230. The sorting system may also associate each imaging file with the corresponding identifier or rough diamond. All the imaging files with their corresponding identifiers are the inventory information. The inventory information may be stored in a database of the sorting system and be available for access by the central system. The sorted diamonds are then transported to a repository. The inventory information may also be stored in a database of the computer system at the repository and be available for access by the central system. The inventory information may also be transmitted to the central system and stored in a database of the central system.

In step 240, the polished diamond parameters may be received by the central system by a Purchaser operating a client computing device to enter the polished diamond parameters 242, transmitting the entered polished diamond parameters to the confidential escrow system by the client computing device 244, and storing the entered polished diamond parameters on the confidential escrow system and be available for access by the central system 246. In some embodiments, the confidential escrow system may be part of the central system and the Purchaser may operate the client computing device to enter the polished diamond parameters and the entered polished diamond parameters may be by the client computing device to the central system directly transmitted. The stored parameters are accessible only by that Purchaser and the central system.

The ordering information may be received by the central system by the Purchaser operating its client computing device to connect to an ordering interface of the central system 248 configured to receive ordering requirements, enter ordering requirements on the ordering interface 250, and store the ordering information in a data base of the central system 252. The ordering information may also be received by operating the client computing device to connect to a browsing interface of the central system 248 configured to view inventories of Sellers, enter a bid price for a rough diamond displayed in an inventory, and store a bid price in a database of the central system. The ordering interface and the browsing interface may be the same or different interface.

In step 260, it may comprise configuring the central system to access stored imaging files and stored polished diamond parameters 262 and analyzing each imaging file with the polished diamond parameters 264. The analysis may compare the associated information in the imaging file with the polished diamond parameters, evaluate the potential polished diamonds that can be produced from the rough diamond based on those parameters, and determine suitability of the rough diamond to the Purchaser based on the evaluation. This step may further comprise outputting only rough diamonds that are suitable to the Purchaser by creating an evaluation file for each. Step 260 can include implemented processes related to incorporating automated intelligent features into the system.

The analysis may further include analyzing each imaging file with the received ordering requirements, in addition to the polished diamond parameters, or analyzing the output from the previous step with the received ordering requirements 266. Rough diamonds in the output that meet the ordering requirements may be output by the central system for the Purchaser's selection.

The ordering requirements may include a bid price. Thus, the analysis based on the ordering requirements may determine if the bid price is at or above the ask price. If it is, in step 280, the method 200 may determine that a diamond transaction should proceed. The central system may communicate with the transaction settlement system in response to that determination to settle the transaction 282. The central system may then notify the Purchaser via its client computing device that it has purchased a rough diamond or rough diamonds in the order and notify the Seller that one or more of its rough diamonds have been sold 284 via its sorting system or the computer system at the repository. The Seller will then remove those rough diamonds from the repository and may ship them to the Purchaser to complete the transaction. Alternatively, the Seller may ship the rough diamonds to a trusted third party who will oversee the completion of the transaction and will deliver the rough diamonds to the Purchaser. This will be the preferred method if the system does not permit the Purchaser and Seller to know each other's identity and location.

The central system, sorting system, settlement system, and confidential escrow system can be implemented using servers or high capacity computers that can handle complex computations. Specialized applications are implemented on each that execute computer operations on the server or computer to carry out the described features.

Embodiments of the present invention may allow Purchasers to purchase rough diamonds individually that have the highest polished sales prices their unique manufacturing processes and polished sales distribution. Systems and methods discussed herein may also reduce liquidating efforts and the number of unnecessary products in the inventory because the Purchaser can purchase only the diamonds it wants individually. Sellers may also achieve high profits by selling each diamond individually rather than having to group them into pre-established assortments. Such systems and methods may be utilized at any time, any frequency, and any location, without being limited to certain sales events hosted at certain locations. Embodiments of the present invention also facilitate immediate, optimal, and accurate rough diamond transactions and connect the seller and buyer for a transaction that is beneficial to both parties.

A benefit of the system achieved by way of a technological solution is that the technological implementation creates advantages to both Sellers and Purchasers to thereby incentivize their participation and migration to the new system. A resulting incentive is that the Sellers and Purchasers can realize better financial results or higher margins. Testing has shown that Sellers and Purchasers will accomplish better financial outcomes. The average price at which diamonds are sold increases due to the structure of the operation of the platform and the Purchasers will not need to engage a secondary market to sell rough diamonds that are not suitable for the manufacturing process and/or distribution. For example, the above illustrative embodiments describe an online rough diamond trading platform or program that stores proprietary manufacturing processes in secure locations and automatically applies the process information to virtual 3D models of rough diamonds to determine "matches" or whether the rough diamond is capable of a polished diamond according to the manufacturer process and as a result identifying a potential polished diamond (in virtual 3D state) that is associated that individual particular rough diamond (which has its own identifier for tracking). By interacting with a user interface of the platform, Sellers can sell rough diamonds to Purchasers as a result of electronic orders. The orders by Purchasers can specify a range such as 1.0-2.5 Carat and other polished diamond specification when purchasing rough diamonds. The platform automatically fills the volume of diamonds ordered individually based on the available data and complex analysis, which can include volume and edge analysis. The interaction, results, in the rough diamonds that meet the specific order parameters to be sorted and aggregated based on corresponding identifiers and transported through a shipping process to the purchaser. Furthermore, an automated intelligent process occurs where the system sources the most suitable and competitively priced rough diamond to satisfy polished diamond orders. In the event of competing polished diamond orders (i.e., a rough diamond is suitable for more than one polished diamond order), the system will allocate the rough diamond toward the polished diamond order with the highest bid price.

An identifier that is associated with a rough diamond can be used to identify the rough diamond (e.g., provide a unique address) for operational management in the system. The identifier is not associated with a polished diamond.

It should be understood that if desired other types of sellers (other than Sellers) or other types of purchasers (other than Purchasers) are contemplated even though the embodiments of the systems and methods are particularly suited for the initial introduction of new rough diamonds into the distribution chain.

Software application and data (such inventory information, polished diamond orders, transaction history, etc.) can be stored in non-transient or non-volatile memory for use in operation of the various features, as party of the overall system or as part of individual elements or as party shared resources (e.g., cloud resources).

The words "may" and "can" are used in the present description to indicate that this is one embodiment but the description should not be understood to be the only embodiment. This is not to say that the term "is" is being to connote that it refers to a required features that must exist.

Exemplary systems, devices, and methods are described for illustrative purposes. Further, since numerous modifications and changes will readily be apparent to those having ordinary skill in the art, it is not desired to limit the invention to the exact constructions as demonstrated in this disclosure. Accordingly, all suitable modifications and equivalents may be resorted to falling within the scope of the invention.

Thus, for example, any sequence(s) and/or temporal order of steps of various processes or methods (or sequence of device connections or operation) that are described herein are illustrative and should not be interpreted as being restrictive. Accordingly, it should be understood that although steps of various processes or methods or connections or sequence of operations may be shown and described as being in a sequence or temporal order, but they are not necessarily limited to being carried out in any particular sequence or order. For example, the steps in such processes or methods generally may be carried out in various different sequences and orders, while still falling within the scope of the present invention. Moreover, in some discussions, it would be evident to those of ordinary skill in the art that a subsequent action, process, or feature is in response to an earlier action, process, or feature.

It is also implicit and understood that the systems and devices illustratively described herein provide computer-implemented functionality that automatically performs a process or process steps unless the description explicitly describes user intervention or manual operation. The process or process steps are performed by a process engine that is implemented by computer using software and data and that does not require human intervention.

It should be understood that claims that include fewer limitations, broader claims, such as claims without requiring a certain feature or process step in the appended claim or in the specification, clarifications to the claim elements, different combinations, and alternative implementations based on the specification, or different uses, are also contemplated by the embodiments of the present invention.

It should be understood that combinations of described features or steps are contemplated even if they are not described directly together or not in the same context.

It should be understood that the disclosure communicates descriptions of systems, methods, and computer readable mediums based on the specifics that are provided.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

The invention claimed is:

1. A computer implemented system comprising a central system comprising one or more computers that are configured with software applications and related data to:
   scan, by the computer implemented system using an imaging system, an interior of each rough diamond of a plurality of rough diamonds from rough diamond inventory information of a diamond seller and an exterior of each rough diamond;
   create, by the computer implemented system, a 3D model showing a location of spatial and physical properties for each rough diamond based on the interior of the rough diamond and the exterior of the rough diamond;
   generate, by the computer implemented system, an imaging file for each rough diamond containing data including the 3D model, the location of the spatial and physical properties, an ask price of the seller and associated information for each rough diamond;
   receive, by the computer implemented system, a manufacturer's desired polished diamond parameters, wherein the manufacturer's desired polished diamond parameters are not accessible to other manufacturers;
   apply, by the computer implemented system, the data in the imaging file to the manufacturer's desired polished diamond parameters for each diamond cut to identify the potential polished diamonds that can be produced from the plurality of rough diamonds that are unique to the manufacturer specifications, unique to polished diamond distribution and based on the manufacturer's desired polished diamond parameters;

apply, by the computer implemented system, a type of manufacturing process for each of the plurality of rough diamonds based on an offer price, a largest value differential between costs of each of the plurality of rough diamonds and a polished diamond, manufacturing processing parameters, customer parameters, the manufacturer's desired polished diamond parameters for a type of polishing and a method of polishing and impacts to the spatial and physical properties for each of the plurality of rough diamonds;

select, by the computer implemented system, a subset of the plurality of rough diamonds based on the applying for each of a plurality of manufacturers;

insert, by the computer implemented system, the plurality of rough diamonds in a rough diamond sorting system to sort the subset of the plurality of rough diamonds among each of the plurality of manufacturers;

store, by the computer implemented system, each subset of the plurality of rough diamonds in a separate repository for each of the plurality of manufacturers to reserve each subset of the plurality of rough diamonds for a sale; and implement, by the computer implement system, the sale between the seller and manufacturer for the subset of the plurality of rough diamonds, in response to the offer price of the manufacturer exceeding the ask price of the seller.

2. The system according to claim 1, wherein the associated information includes shape, cutting style, physical dimensions, weight, diameter, crown information, girdle information, pavilion information, table information, clarity grade, color grade, and type.

3. A computer implemented method comprising:

scanning, by a computer implemented system using an imaging system, an interior of each rough diamond of a plurality of rough diamonds from rough diamond inventory information of a diamond seller and an exterior of each rough diamond;

creating, by the computer implemented system, a 3D model showing a location of spatial and physical properties for each rough diamond based on the interior of the rough diamond and the exterior of the rough diamond;

generating, by the computer implemented system, an imaging file for each rough diamond containing data including the 3D model, the location of the spatial and physical properties, an ask price of the seller and associated information for each rough diamond;

receiving, by the computer implemented system, a manufacturer's desired polished diamond parameters, wherein the manufacturer's desired polished diamond parameters are not accessible to other manufacturers;

applying, by the computer implemented system, the data in the imaging file to the manufacturer's desired polished diamond parameters for each diamond cut to identify the potential polished diamonds that can be produced from the plurality of rough diamonds that are unique to the manufacturer specifications, unique to polished diamond distribution and based on the manufacturer's desired polished diamond parameters;

applying, by the computer implemented system, a type of manufacturing process for each of the plurality of rough diamonds based on an offer price, a largest value differential between costs of each of the plurality of rough diamonds and a polished diamond, manufacturing processing parameters, customer parameters, the manufacturer's desired polished diamond parameters for a type of polishing and a method of polishing and impacts to the spatial and physical properties for each of the plurality of rough diamonds;

selecting, by the computer implemented system, a subset of the plurality of rough diamonds based on the applying for each of a plurality of manufacturers;

inserting, by the computer implemented system, the plurality of rough diamonds in a rough diamond sorting system to sort the subset of the plurality of rough diamonds among each of the plurality of manufacturers;

storing, by the computer implemented system, each subset of the plurality of rough diamonds in a separate repository for each of the plurality of manufacturers to reserve each subset of the plurality of rough diamonds for a sale; and implementing, by the computer implement system, the sale between the seller and manufacturer for the subset of the plurality of rough diamonds, in response to the offer price of the manufacturer exceeding the ask price of the seller.

4. The method according to claim 3, wherein the determining step is performed in response to a particular polished diamond order that specifies an individual polished diamond using manufacturing process parameters that are specific to polished diamonds which includes a particular one of that manufacturer's confidential and proprietary polished diamond manufacturing process parameters.

5. The method according to claim 3, wherein the selecting step is performed until the polished diamond order is fulfilled.

6. The system according to claim 1, wherein the manufacturing process parameters are provided to a confidential escrow system by the manufacturer, and received from the escrow system, wherein the manufacturing process parameters are accessible only by the corresponding manufacturer and the central system.

7. The method according to claim 3, further comprising receiving and storing subsequent rough diamond inventory information.

8. The method according to claim 3, wherein the manufacturing process parameters are provided to a confidential escrow system by the manufacturer, and received from the escrow system, wherein the manufacturing process parameters are accessible only by the corresponding manufacturer and the central system.

9. The system according to claim 1, further configured with software applications and related data to:

place, by the computer implemented system using a sorting system, the subset of the plurality of rough diamonds in a container having an identification number;

check, by the computer implemented system, identifiers of the rough diamonds at different points in a distribution chain to confirm secure transfer to the manufacturer.

10. A method comprising:

receiving, by a processor, polished diamond parameters from a plurality of manufacturers about a plurality of raw diamonds, prior to the plurality of manufacturers seeing the plurality of raw diamonds, wherein the polished diamond parameters are not accessible to other manufacturers, wherein the polished diamond parameters for the plurality of raw diamonds comprising shapes for subsets of the plurality of polished diamonds, angles of subsets of the plurality of polished diamonds, cuts of subsets of the plurality of polished diamonds, desired sales prices for each of the plurality of polished diamonds, number of each of the plurality of raw diamonds to be sold at the desired sales price, acceptable diamond mines of origin for the plurality of rough diamonds, costs, profile for each of the plurality of polished diamonds, color for each of the plurality of polished diamonds, maximum number of the plurality of raw diamonds for purchase, and losses due to a cutting style used in the manufacturing process parameters;

developing, by the processor, a manufacturing processing plan for each of the plurality of raw diamonds based on the polished diamond parameters from the plurality of manufacturers;

determining, by the processor, a maximum value of each of the plurality of raw diamonds based on the manufacturing processing plan from the plurality of manufacturers;

assigning, by the processor, each of the plurality of raw diamonds to one or more of the plurality of manufacturers based on the number of each of the plurality of raw diamonds at the desired sales price by the one or more of the plurality of manufacturers;

notifying, by the processor, the one or more of the plurality of manufacturers about a subset of the plurality of raw diamonds assigned to each of the one or more of the plurality of manufacturers;

inserting, by the processor, the plurality of rough diamonds in a rough diamond sorting system to sort the subset of the plurality of rough diamonds among each of the plurality of manufacturers;

storing, by the processor, each subset of the plurality of rough diamonds in a separate repository for each of the plurality of manufacturers to reserve each subset of the plurality of rough diamonds for a sale; and implementing, by the processor, the sale between the seller and manufacturer for the subset of the plurality of rough diamonds, in response to the offer price of the manufacturer exceeding the ask price of the seller.

11. The method of claim 10, wherein the maximum number of the plurality of polished diamonds for purchase includes a number of a subset of the plurality of polished diamonds for purchase.

12. The method of claim 10, wherein:

the desired sales prices for each of the plurality of polished diamonds are associated with a desired size, color, clarity and fluorescence;

the costs are for certification and labor; and the color for each of the plurality of polished diamonds includes color probability.

* * * * *